UNITED STATES PATENT OFFICE.

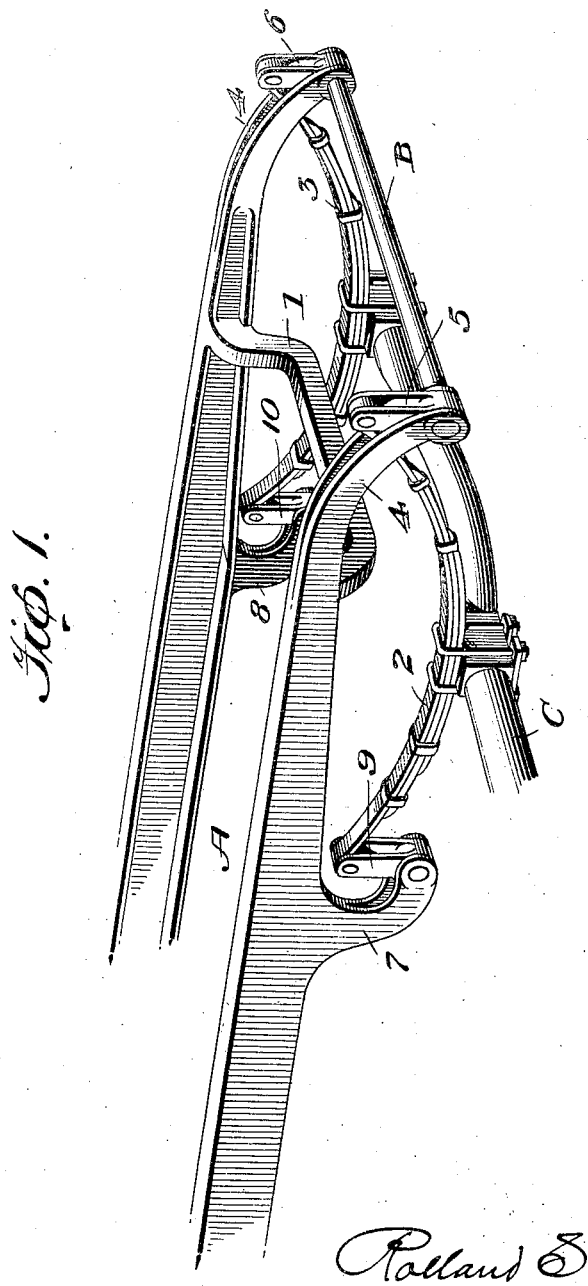

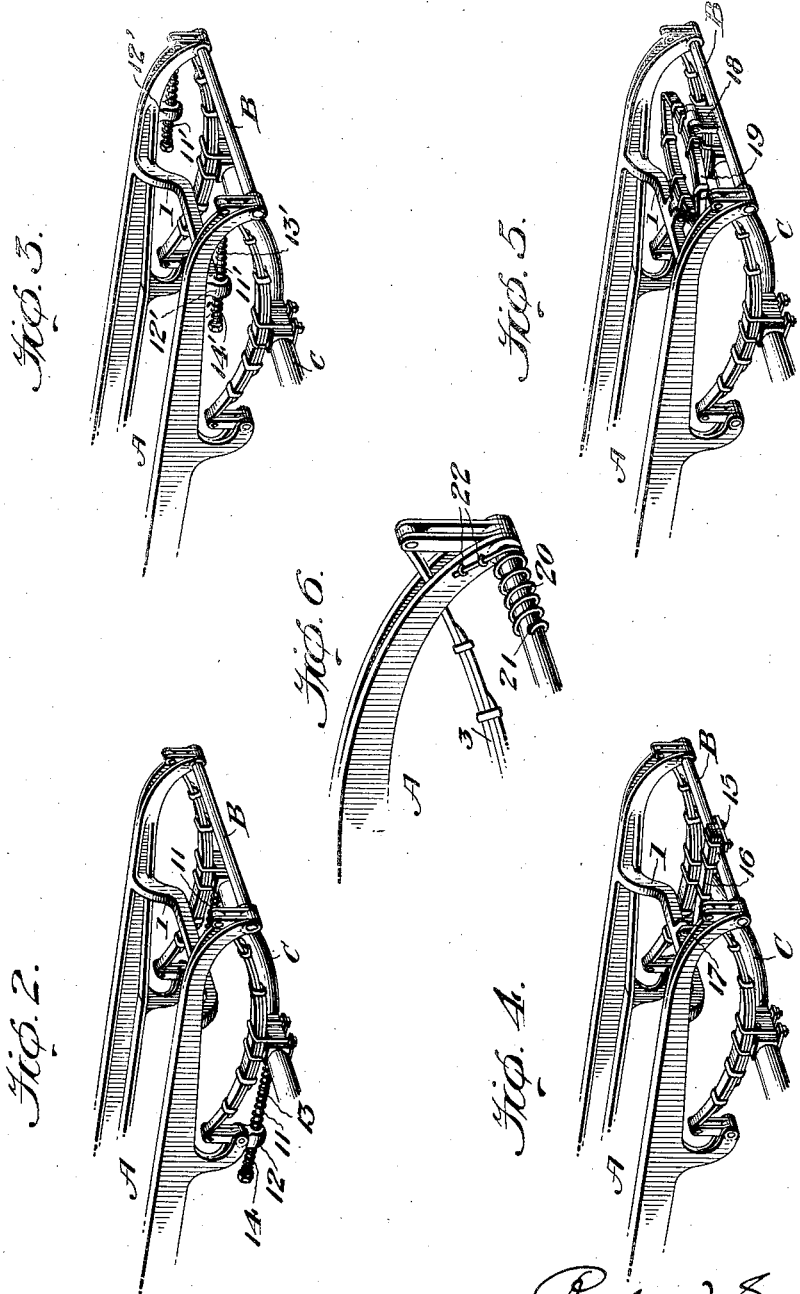

ROLLAND S. TROTT, OF DENVER, COLORADO.

VEHICLE SPRING SUSPENSION.

1,327,746.   Specification of Letters Patent.   Patented Jan. 13, 1920.

Application filed September 17, 1913, Serial No. 790,337. Renewed February 19, 1919. Serial No. 278,061.

*To all whom it may concern:*

Be it known that I, ROLLAND S. TROTT, citizen of the United States, residing at city and county of Denver and State of Colorado, have invented certain new and useful Improvements in Vehicle Spring Suspensions, of which the following is a specification.

My invention relates to an improvement in vehicle spring suspensions, and more particularly to that type intended to accomplish the purpose for which the structures shown in the Patents 1,029,731 and 1,029,732, issued to me June 18, 1912; namely, to permit movement of the axle in a direction of the longitudinal center of the frame of the vehicle, and while permitting this movement, preclude the possibility of lateral twisting movement of the axle, and insure that it will be restored to its normal position.

The object of this invention is to provide a spring suspension which may be applied directly to the load springs by which the frame is supported on the axle. The present trend in the manufacture of motor cars to which this invention is particularly adaptable is to throw the body structure as close to the road as practicable. When the vehicle is so constructed, the engine and other mechanism is necessarily placed low, and there is some difficulty and complication in designing the structure, so that a reach as disclosed in my patents above referred to can be provided and yet maintain a sufficient road clearance.

A still further object is to so construct and arrange the parts that the load springs coöperate to hold the axle rightly alined, and to return the axle to its normal position when it has been moved in a direction longitudinal of the frame.

This invention relates to still other novel features of construction and combinations of parts which will be hereinafter described and pointed out in the claims.

In the accompanying drawings;

Figure 1 is a view in perspective of one end of a vehicle frame, showing my invention applied thereto;

Figs. 2 and 3 are perspective views disclosing the manner of connecting the spiral springs to aid in the restoration of the axle;

Figs. 4 and 5 are similar views disclosing the use of a leaf spring to aid in the restoration; and Fig. 6 is a detail perspective view disclosing another adaptation of the coil spring.

Referring to Fig. 1, in which the spring suspension is shown applied to the front axle, the frame A is made in the usual manner from channel iron or other suitable material, with the sides thereof parallel.

A cross-bar 1 holds the sides apart. The frame may be of standard construction, except that where the springs 2 and 3 are attached to the sides of the frame at their forward ends, the frame is preferably bifurcated as at 4, 4, to straddle the forward ends of the springs.

The springs 2 and 3 are shown of the semi-elliptic type built up from a plurality of leaves and having the ends of the leaves secured together by clips in the usual manner.

A cross shaft B is received between the ends of the side members of the frame A, and is journaled in the bifurcated portion 4 thereof.

A link 5 is secured to the shaft B at a point preferably within the bifurcated end of one of the side members, and the spring 2 is pivoted at its forward end to the link 5.

A similar link 6 is secured to the opposite end of the shaft B also preferably within the bifurcated end of the other side member, and the spring 3 is pivoted at its forward end to the free end of this link 6. Brackets 7 and 8 extend downwardly from the side members of the frame at a point back from the ends thereof, and these brackets, like the ends of the side members, are preferably bifurcated to receive the links 9 and 10.

The rear ends of the springs 2 and 3 are pivoted to the links 9 and 10 respectively.

The axle C is secured in any suitable manner to the springs 2 and 3, and has the wheels mounted thereon in the usual manner.

As the shock is sustained by the wheel on that end of the axle to which the spring 2 is secured, the links 5 and 9 will be forced backwardly.

As the link 5 is rigidly mounted on the shaft B, the link 6 will have its pivotal connection with the spring 3 moved in the same relative arc, and that end of the axle C to which this spring 3 is secured will be caused to move backwardly to the same extent as the end on which the wheel sustaining the shock is mounted.

In this way the axle is maintained at all times in a position at right angles to the line of draft or length of the frame, while at the same time the axle is free to move lengthwise of the frame.

By reason of the fact that the pivotal connection between the links 9 and 10 and the links 5 and 6 is above the pivotal connection of these links with the frame, the tendency will be for the axle to automatically resume its normal position.

In a vehicle which is not intended to be driven at a high rate of speed, this structure would operate very well, but where the vehicle is traveling at a high rate of speed, and is coming constantly in contact with irregularities and obstructions the movement of the axle due to the underslung suspension, as it were, of the frame with respect to the springs is apt to prove too sluggish; that is, not sufficiently quick to restore the normal relation of parts.

To overcome this objection, it may be advisable to provide endwise shock springs which will restore the axle more quickly to its normal position, and which will at the same time cushion the shock as the axle is thrown from its position and also the rebound.

In each of the modified forms, I have shown a construction as hereinbefore described, and the only change is that various forms of spring structure which may be used for restoring the axle are disclosed.

In Figs. 2 and 3 I have shown one adaptation of the spiral spring.

In Fig. 2 a rod 11 is connected with the axle C. This rod passes through a bracket 12 mounted on the frame, and on each side of the bracket, shock and rebound springs 13 and 14 are mounted around the rod.

With this form, when the vehicle is traveling in a forward direction, the movement of the axle longitudinally of the frame is resisted by the spring 13, and the shock incident to this movement is absorbed thereby, the rebound being taken care of by the spring 14, and of course if the vehicle is traveling in the rear direction, the springs would perform a reverse function.

In Fig. 3 I have disclosed the rod 11 as secured to the link at a point adjacent the connection of the load spring therewith and the spiral springs 13' and 14' bearing on each side of bearing 12'.

In both of these forms, it is preferable that the endwise shock springs be provided at each end of the axle, although they can be mounted in the center of the frame or at any other point, and probably equally good results obtained.

In Fig. 4 I have shown a form in which an arm 15 is provided to extend from the cross shaft B approximately at right angles to the extent of the links 5 and 6, and a rectilinear leaf spring 16 is secured to this arm and is connected at its free end by a link 17 with the cross bar 1 of the frame. With this form, any swinging movement of the links or turning movement of the shaft B is resisted by the rectilinear spring 16.

In Fig. 5 an arm 18 is formed on the cross shaft B to extend in a line approximately parallel with the extent of the links 5 and 6, and a full elliptic spring 19 is pivoted on its one side to this arm, and on its opposite side, to cross bar 1 of the frame, so that as the links 5 and 6 swing to turn, movement of the cross shaft B is resisted by the action of the spring against the arm 18.

In Fig. 6 a coil spring 20 is received around the shaft B within the side member of the frame. This spring is secured at its one end at 21 to the shaft, and at the opposite end is connected rigidly by straps or other means 22 with the frame, thus when the shaft B is turned through the swinging of the links 5 and 6, this turning action is resisted by the spring 20.

While I have disclosed my invention as applied to the front axle of a vehicle, and the righting device as applied to the forward end of the springs, it will be apparent that the invention will be just as readily applied to the rear axle and the righting mechanism might be applied to the rear ends.

It is, however, desirable that this righting mechanism be applied to the forward ends when possible, as by such an arrangement the movement of the axle exerts a pulling strain upon the spring to swing the link, whereas if a pushing strain were exerted, there might be some tendency of the spring to buckle, and thus the axle would be thrown slightly out of square.

Further, while the links have been described as being under tension, or having the frame underslung with respect to their connection to the load springs, it is evident that they might be under compression or with the frame overslung, and by the use of the endwise shock spring, obtain the same result, also the one end might be under compression and the other in suspension, or a bearing could be provided to slide on the frame or to work on a roller connected with the frame at one end of the spring. I have described the frame as bifurcated at the ends of the side members to receive the links 5 and 6 and the brackets also made bifurcated. It will be seen that both frame and brackets might be made straight and by the use of stud shafts or other approved structure the springs could be mounted to obtain the same result, and to maintain the same rigidity of the parts, the parts being shown and described as being bifurcated only because, at the present time, that seems to be the preferred construction.

This invention has been described as adapted for use with a semielliptic spring, but as will be apparent, it can be applied to other forms with slight modification, and also other forms of endwise shock springs can be applied without departing from the invention.

Having fully described my invention, what I claim as new and desire to secure by Letters Patent is:

1. In a vehicle, a horizontally movable axle, springs, and a cross-shaft connected with the springs to equalize the horizontal movement of the two ends of the axle.

2. In a vehicle, a resiliently opposed horizontally movable axle, load-springs, and a cross-shaft connected with the springs to equalize the horizontal movement of the two ends of the axle.

3. In a vehicle, a horizontally movable axle, springs, a cross-shaft, and links interposed between the shaft and springs to equalize the horizontal movement of the two ends of the axle.

4. In a vehicle, a resiliently opposed horizontally movable axle, springs, a cross-shaft, and links interposed between the shaft and springs to equalize the horizontal movement of the two ends of the axle.

5. The combination of a vehicle-frame, horizontally movable axle, load-springs connected with the frame and axle, and rockable means forming a connection across between opposite sides of the vehicle-frame to equalize the horizontal movement of the ends of the axle.

6. The combination of a vehicle-frame, horizontally movable axle, load-springs connected with the frame and axle, rockable means forming a connection across between opposite sides of the vehicle-frame, and means for resiliently opposing horizontal movement of the axle.

7. A vehicle-spring suspension comprising a vehicle-frame, horizontally movable axle, a pair of load-springs secured to the axle, links connecting the springs with the frame, and means carrying and rocking with the links connecting the load-springs together, thereby equalizing the horizontal movement of the ends of the axle.

8. A vehicle-spring suspension comprising a vehicle-frame, horizontally movable axle, a pair of load-springs secured to the axle, links connecting the springs with the frame, means carrying and rocking with the links connecting the load-springs together, thereby equalizing the horizontal movement of the ends of the axle, and means for resiliently opposing horizontal movement of the axle.

9. In a vehicle spring suspension, a frame, a horizontally movable axle, load-springs, a rockable cross shaft, and means connecting the ends of the springs to the frame and to the shaft whereby the axle is capable of an equalized horizontal movement.

10. In a vehicle spring suspension, a frame, a horizontally movable axle, load-springs, a rockable cross-shaft, means connecting the ends of the springs to the frame and to the shaft, whereby the axle is capable of equalized horizontal movement, and means for resiliently opposing horizontal movement of the axle.

11. A vehicle spring suspension comprising load-springs, horizontally movable axles secured thereto, and means parallel with the axle connecting the springs, whereby the horizontal movement of the ends of the axle is equalized and said means and axle are maintained in a parallel plane.

12. A vehicle spring suspension comprising load-springs, horizontally movable axles secured thereto, means parallel with the axle connecting the springs, whereby the horizontal movement of the ends of the axle is equalized and said means and axle are maintained in a parallel plane, and means for resiliently opposing horizontal movement of the axle.

13. The combination with a frame and axle, of a shaft journaled on the frame, links secured to said shaft, load-springs secured to the axles and connected with said links supporting said load-springs, and all of said parts so arranged that the axle has free movement in a direction longitudinal of the frame, and all lateral or twisting movement is precluded.

14. The combination with a frame and a horizontally movable axle, of rocker connected springs interposed between them and connected to each in such a manner as to permit of the equalized horizontal movement of the ends of the axle.

15. Rocker connected load springs, a frame supported thereby, and an axle secured to the springs, said axle being capable of a free movement in a direction longitudinal of the frame.

16. The combination with a frame and axle, of a shaft journaled on the frame, links secured to said shaft and frame near the ends thereof, load springs secured to the axles and connected with said links supporting said load springs at their opposite ends, and all of said parts so arranged that the axle has free movement in a direction longitudinal of the frame, and all lateral or twisting movement is precluded.

17. The combination with a frame and axle, of a shaft journaled on the frame, links secured to said shaft and frame near the ends thereof, load springs secured to the axles and connected with said links supporting said load springs at their opposite ends, all of said parts so arranged that the axle has free movement in a direction longitudinal of the frame, and all lateral or twisting movement is precluded, and means for resiliently opposing said free longitudinal movement and for restoring the axle to its normal position.

18. The combination with a vehicle frame and axle, of a shaft connected across the frame, load springs secured to the axles, links secured on said shaft and pivotally connected with said load springs at one end thereof, links connecting the opposite ends of the springs to have swinging movement with the frame all of said parts arranged to permit movement of the axle in a direction of the longitudinal extent of the frame and to preclude twisting movement, springs positioned to resiliently oppose said movement of the axle and to restore the axle to its normal position.

In testimony whereof I affix my signature, in the presence of two witnesses.

ROLLAND S. TROTT.

Witnesses:
   CHAS. E. STRATTON,
   ROBERT BEEDLE.